(12) United States Patent
Brasseur et al.

(10) Patent No.: US 10,001,848 B2
(45) Date of Patent: Jun. 19, 2018

(54) CONTROL PANEL, ESPECIALLY FOR AN OVEN, AND OVEN, ESPECIALLY DOMESTIC OVEN

(75) Inventors: Jerome Brasseur, Ulfsunda (SE); Arnd Hofmann, Lulsfeld (DE); Petter Karlsson, Stockholm (SE); Martin Knausenberger, Rothenburg ob der Tauber (DE); Stefan Lehmann, Dombuhl (DE)

(73) Assignee: Electrolux Home Products Corporation N.V., Brussels (BE)

( * ) Notice: Subject to any disclaimer, the term of this patent is extended or adjusted under 35 U.S.C. 154(b) by 0 days. days.

(21) Appl. No.: 13/701,566

(22) PCT Filed: Jun. 20, 2011

(86) PCT No.: PCT/EP2011/003039
§ 371 (c)(1),
(2), (4) Date: Dec. 3, 2012

(87) PCT Pub. No.: WO2011/157451
PCT Pub. Date: Dec. 22, 2011

(65) Prior Publication Data
US 2013/0082971 A1 Apr. 4, 2013

(30) Foreign Application Priority Data
Jun. 19, 2010 (EP) .................... 10006383

(51) Int. Cl.
*G06F 3/041* (2006.01)
*F24C 7/08* (2006.01)

(52) U.S. Cl.
CPC ............. *G06F 3/041* (2013.01); *F24C 7/085* (2013.01); *F24C 7/086* (2013.01)

(58) Field of Classification Search
USPC ................................. 345/173–179
See application file for complete search history.

(56) References Cited

U.S. PATENT DOCUMENTS

| 4,669,984 | A | * | 6/1987 | Jones | ..................... G09B 11/04 |
| | | | | | 434/85 |
| 6,262,709 | B1 | * | 7/2001 | Masuda | ................ G06F 3/0236 |
| | | | | | 345/467 |

(Continued)

FOREIGN PATENT DOCUMENTS

| DE | 102006039235 | 2/2008 |
| DE | 102008032453 | 1/2010 |

(Continued)

OTHER PUBLICATIONS

International Search Reports for PCT/EP2011/003039, dated Nov. 4, 2011, 3 pages.

*Primary Examiner* — Robin Mishler
(74) *Attorney, Agent, or Firm* — Pearne & Gordon LLP

(57) ABSTRACT

The invention relates to an oven, especially to a domestic oven, which has a control panel comprising a user interface (1) for inputting data (D) into the control panel, wherein the user interface (1) comprises: at least one display element (2) for displaying data, wherein data (D) can be displayed on the display element (2) at a location (Z) on the display element (2) at a predetermined first axial position (x) and a predetermined second axial position (y), wherein the direction of the first (x) and of the second (y) axial positions are perpendicular to another, selecting means (3, 4) for selecting the location (Z) on the display element (2) by selecting or pretending a definite first (x) and second (y) position for a cursor (5), wherein at least one of the selecting means (3, 4) are established as a slider element extending in a longitudinal direction (L) and having a surface (6) sensitive for touching with a finger (7) of the user, wherein a control unit is arranged to position the cursor (5) in a position or direction (x, y) on the display element (2) in dependence on the location or movement of the finger (7) on the slider element (3, 4) in the longitudinal direction (L). By this an (Continued)

Figure 1:
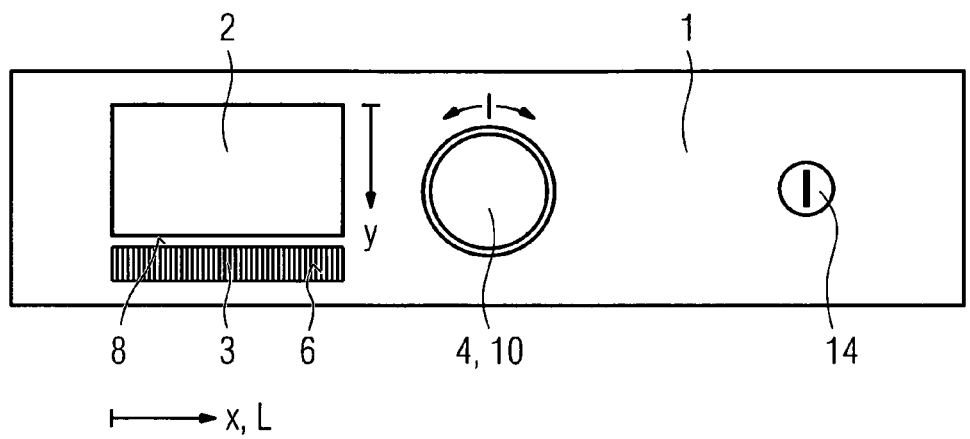

improved interaction between the user and the oven becomes possible. Furthermore, the invention relates to a method for selecting and inputting an information into the control panel of the oven.

19 Claims, 3 Drawing Sheets

(56) References Cited

U.S. PATENT DOCUMENTS

| | | |
|---|---|---|
| 6,704,032 B1 * | 3/2004 | Falcon et al. ............... 715/746 |
| 2003/0043174 A1 * | 3/2003 | Hinckley ............ G06F 3/03547 |
| | | 345/684 |
| 2003/0150853 A1 | 8/2003 | Kang |
| 2003/0201972 A1 * | 10/2003 | Usuda ................... G06F 1/1626 |
| | | 345/156 |
| 2007/0046646 A1 * | 3/2007 | Kwon et al. ................ 345/173 |
| 2007/0050732 A1 * | 3/2007 | Chapman, Jr. ...... G05D 23/1902 |
| | | 715/810 |
| 2008/0202823 A1 * | 8/2008 | Won .................... G06F 3/03547 |
| | | 345/156 |
| 2008/0243381 A1 * | 10/2008 | Villalobos et al. ........... 701/211 |
| 2009/0273571 A1 | 11/2009 | Bowens |
| 2010/0026651 A1 * | 2/2010 | Soloviev ............... G06F 1/1626 |
| | | 345/173 |
| 2010/0056221 A1 * | 3/2010 | Park ........................ G06F 3/048 |
| | | 455/566 |
| 2010/0103116 A1 * | 4/2010 | Leung et al. ................ 345/173 |
| 2012/0019471 A1 * | 1/2012 | Schlipf ................ G06F 3/0236 |
| | | 345/173 |

FOREIGN PATENT DOCUMENTS

| | | |
|---|---|---|
| EP | 1785821 | 5/2007 |
| GB | 2451267 | 1/2009 |
| WO | 2005019766 | 3/2005 |

* cited by examiner

CONTROL PANEL, ESPECIALLY FOR AN OVEN, AND OVEN, ESPECIALLY DOMESTIC OVEN

The invention relates to a control panel, especially for an oven, and to an oven, especially to a domestic oven, which has a control panel comprising a user interface for inputting data into the control panel as well as to a method for selecting and inputting an information into a control panel of an oven.

Modern ovens, especially domestic ovens, offer a wide spectrum of different functions for the heat treatment of food and beverages and for maintaining the oven. Particularly, the integration of additional technologies is widely used, like microwave heating or steam cooking. So, an optimized cooking process is available for a broad spectrum of cooking applications.

It is unavoidable that the complexity of the operation of a modern oven becomes higher with the multitude of functions which is integrated in the oven. The data transfer between the user and the oven takes place by a user interface. Thus, it is aimed that the operation of the oven by using the user interface should be as intuitive as possible.

In the state of the art multiple variants exist for designing a user interface. Also a lot of different kinds of switches and operation elements exist for handling the user interface.

Examples are disclosed for instance in DE 10 2006 009 846 A1, in DE 10 2005 049 802 A1, in DE 10 2004 048 463 A1, in DE 10 2007 008 896 A1, in DE 10 2007 029 174 A1, in DE 10 2008 026 527 A1, in DE 10 2008 032 453 A1 and in DE 21 2004 000 044 U1.

In spite of the fact that a wide range of possibilities exists to operate the user interface it stays difficult especially for an inexperienced user to get the full advantage of the technological potential of his oven when it comes to an intuitive approach of handling. Current oven interfaces often either confuse an inexperienced user due to too much means of input or the input of parameters is just annoying and time-consuming.

Therefore, it is an object of the present invention to propose an oven of the kind mentioned above with a user interface which allows an improved interaction between the user and the oven and a corresponding control panel.

The solution of this object according to the invention comprises a user interface with at least one display element for displaying data, wherein data can be displayed on the display element at a location on the display element at a predetermined first axial position and a predetermined second axial position, wherein the direction of the first and of the second axial positions are perpendicular to another, and selecting means for selecting the location on the display element by selecting (or: pretending) a definite first and second position for a cursor, wherein at least one of the selecting means is/are established (or: designed) as a slider element extending in a longitudinal direction and having a surface sensitive for touching with a finger of the user, wherein a control unit is arranged to position the cursor in a position (or: direction) on the display element in dependence on the location (or: movement) of the finger on the slider element in the longitudinal direction.

At least one slider element can be arranged parallel to one of the edge sides of the display element.

According to a first embodiment one slider element is arranged parallel to one of the edge sides of the display element for locating the cursor in the first direction on the display element, wherein one slider element is arranged parallel to another edge side of the display element for locating the cursor in the second direction on the display element.

An alternative suggests that one slider element is arranged parallel to one of the edge sides of the display element for locating the cursor in the first direction on the display element and that a rotary encoder is arranged for locating the cursor in the second direction on the display element. Here, the axis of rotation of a rotating wheel of the rotary encoder can be arranged perpendicular to the surface area of the display element.

A further alternative is characterized in that one slider element is arranged parallel to one of the edge sides of the display element for locating the cursor in the first direction on the display element and that at least one selection button is arranged for locating the cursor in the second direction on the display element.

In at least one of the end regions of the slider element a switch function can be arranged to trigger a data input into the control panel.

The at least one slider element can have an anti-stick coating.

The at least one display element is preferably a pixel controlled display.

The invention furthermore relates to a control panel according to the invention, especially for an oven, comprising a control panel comprising a user interface for inputting data into the control panel, wherein the user interface comprises:
at least one display element for displaying data, wherein data can be displayed on the display element at a location on the display element at a predetermined first axial position and a predetermined second axial position, wherein the direction of the first and of the second axial positions are perpendicular to another,
selecting means for selecting the location on the display element by selecting or pretending a definite first and second position for a cursor,
wherein at least one of the selecting means are established (or: designed) as a slider element extending in a longitudinal direction and having a surface sensitive for touching with a finger of the user, wherein a control unit is arranged to position the cursor in a position or direction on the display element in dependence on the location or movement of the finger on the slider element in the longitudinal direction.

The method for selecting and inputting information into a control panel of an oven by using a user interface with the mentioned display element and selecting means comprises the steps of:
a) selecting an information displayed on the display element by moving a finger of the user along the surface of a slider element in a longitudinal direction, until the cursor has reached the desired information in a first position or direction on the display element and
b) selecting the information displayed on the display element by positioning the cursor or moving the cursor until it has reached the desired information in the second direction on the display element by means of a second selecting means.

Preferably, the selection according to mentioned step b) is done by moving a finger of the user along the surface of a second slider element in a longitudinal direction, until the cursor has reached the desired information in the second direction on the display element.

Alternatively, the selection according to mentioned step b) can be done by actuating a rotary encoder until the cursor has moved in the second direction on the display element.

The position of the cursor in an axial direction can depend on the contact point of the finger of the user with the slider element along the longitudinal direction.

Alternatively, it is also possible that the moving speed of the cursor in an axial direction depends on the contact point of the finger of the user with the slider element along the longitudinal direction, wherein the speed increases continuously along the longitudinal direction of the slider element.

An alternative of the speed control of the cursor suggests that the moving speed of the cursor in an axial direction depends on the contact point of the finger of the user with the slider element along the longitudinal direction, wherein the speed is zero at a longitudinal position between the ends of the slider element.

Thus, for improving the interaction between the user and the oven the main functional component of the user interface consists of a sensor area being sensitive for finger movement while being touched. More specifically, the sensor area is sensitive for sliding actions of at least one finger at the same time. Therefore, the invention employs a "touch slider" (sliding element).

The touch slider is connected to a display, which is preferably carried out as a pixel controlled display. Furthermore, at least one additional means of selecting between items of a multi-element list is part of the user interface. Those additional means preferably is a rotary (bit) encoder; also one of more touch sliders can be engaged.

Preferably, the movement of a finger of the user on the touch slider sensor allows the navigation through the main categories of the software of the control panel, specifically in one-directional or bi-directional move through different elements of a category at different speed in dependence of the position of the finger.

To avoid the panel of the oven interface being contaminated by dirty fingers (e. g. by fat, moist or cake dough) the slider element can be supplied with an anti-stick coating in the area of the slider sensor to reduce negative visible impact.

A touch slider in combination with the mentioned additional means of input can be used to ease the input of alpha-numeric characters, in particular for naming user-defined programs.

By the proposed design and the suggested method the following advantages can be obtained:

No or less mechanical keys are visible. Therefore, a nicer appearance in terms of design of the control panel becomes possible.

With respect to reliability of the control panel it is beneficial that no mechanical wear like in the case of mechanical keys takes place.

Also the functionality of the control panel is improved. Defined areas for the user input are defined. The user can set categories or parameter values faster compared with conventional means of data input, like e. g. arrow keys.

The invention takes advantage of the fact that the perception of human being is multidimensional. This is used to improve the user's intuition when operating the user interface. The moving action of the different input means is always orthogonal. Thus, the navigation menu of an oven according to the invention contains at least one structure containing selectable items in rows and columns. By the geometrical orientation of the proposed touch sliders the direction of navigation in this structure is determined. One of the additional means of selection allows a selection of items being orthogonally arranged referred to the direction of navigation by said slider.

Preferably, the main categories are either arranged in a row or in a column, whereas the sub-categories of a main category each are orthogonally arranged.

In the drawings embodiments of the invention are depicted.

Figure 2:
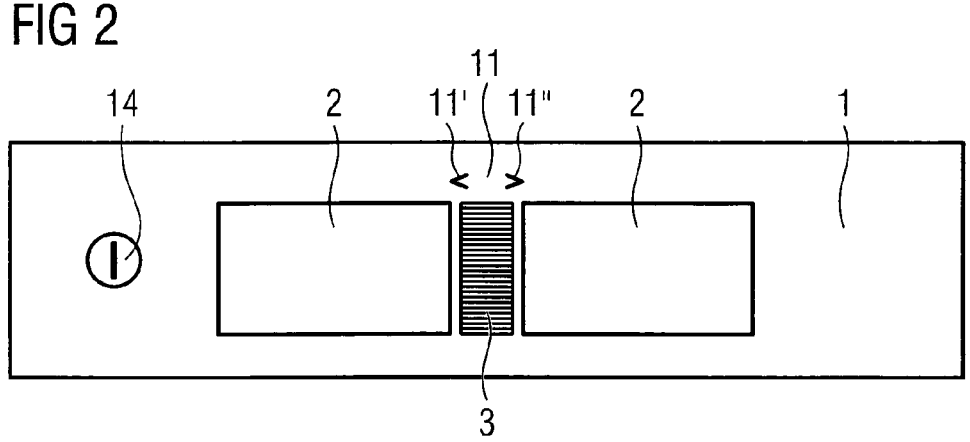
Figure 3:
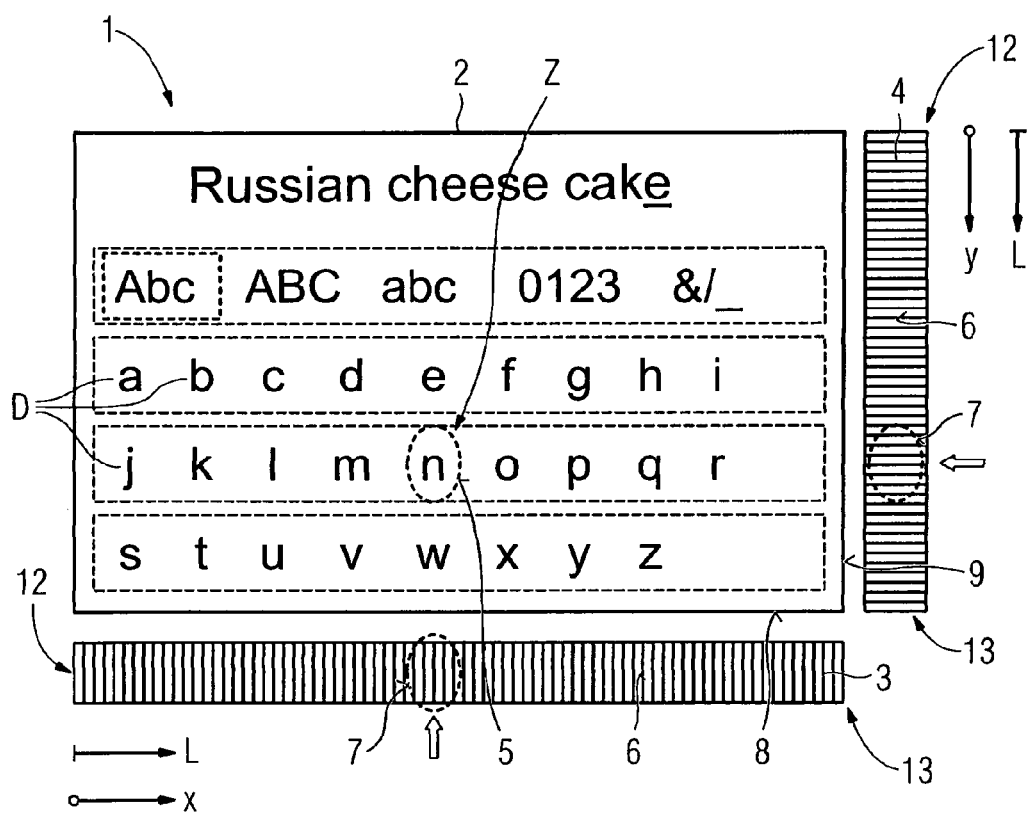

FIG. 1 shows a front view of a user interface of a domestic oven according a first embodiment of the invention, FIG. 2 shows a front view of the user interface according to a second embodiment of the invention, FIG. 3 shows a front view of the user interface according to a third embodiment of the invention, FIG. 4*a* to FIG. 4*d* show four examples of the velocity (speed) of a cursor depending on the position of a finger on a slider element.

In FIG. 1 a user interface 1 of a domestic oven is shown which is used to exchange data between a user and the control system of the oven. The user interface 1 has an On-/Off-Switch 14. To input data into the control system of the oven the user interface 1 has a display element 2 where data can be displayed (details shown in FIG. 3). To input data into the control system the respective data which is shown at the display element 2 is selected and inputted.

For doing so, a selecting means in the form of a sliding element 3 is arranged below the display unit 2. More specifically, the sliding element 3 is a touch slide element with a sensitive surface 6. The shape of the sliding element 3 is rectangular. Furthermore, the arrangement of the sliding element 3 is parallel to the lower edge side 8 of the display element 2. The sliding element 3 thus extends in a longitudinal direction L which corresponds with a first axial direction x. In other words, the longitudinal direction L corresponds to an x-axis (abscissa) of the coordinate plane which is formed by the two dimensions of the display element 2.

The selection of a data value in the direction of the x-axis is selected by moving a finger on the sliding element 3 along the longitudinal direction L. By doing so, a cursor (see FIG. 3) moves in the direction of the x-axis until the finger stops of leaves the sliding surface 6. Consequently, the selection of a data value takes place in one of the direction (x-axis).

To select a data value in terms of the perpendicular y-axis (ordinate) a selecting means 4 being a rotary encoder 10 is employed. When a wheel element of the rotary encoder is turned in the clockwise direction the cursor moves downwards in y-direction; if the wheel element is turned in the counter-clockwise direction the cursor moves upwards in y-direction.

When the desired data is captured in x- and y-direction is can be selected e. g. be pressing the rotary encoder 10.

Thus, FIG. 1 shows an example for setup of an oven panel with horizontal slider and rotary bit encoder.

Another version is shown in FIG. 2. Here an example is depicted for a setup of an oven panel with two displays, a vertical slider in-between the display units and arrow keys above said central slider.

More specifically, two display elements 2 are arranged symmetrically. Between the two display elements 2, a sliding element 3 is arranged. To move a cursor up and down, the finger of the user slides along the longitudinal direction L of the sliding element 3. When the desired vertical position of the cursor is reached a selection button 11 is operated to move the cursor in horizontal direction. Specifically, the button 11 is split into two buttons 11' and 11" with different orientation. So, in an analogous way a data value displayed on the display elements 2 can be captured and selected.

FIG. 3 shows an example of the input of alpha-numeric signs with a setup of the oven interface consisting of a display element and two touch sliders.

In the present example a stored receipt can be recalled from a storage of the control unit. For doing so, the alpha-numeric characters of the name of the receipt (in the example "Russischer Zupfkuchen") is inputted by the user interface 1. As can be seen the display element 2 has again a rectangular shape. In the display element 2 data D are displayed. A cursor 5 is moved to a definite location Z to select an alpha-numeric data.

For doing so two sliding elements 3 and 4 are arranged which are running parallel to the edge sides 8 and 9 of the display unit 2. Along the longitudinal direction L of the sliding element 3 the x-axis extends; correspondingly, along the longitudinal direction L of the sliding element 4 the y-axis extends. If the finger 7 of the user is moved along the sliding elements 3, 4 the cursor 5 moves correspondingly to the location Z. The selected alpha-numeric value can then be inputted e. g. by pressing one of the end regions 12 or 13 of the sliding element 3 or 4.

Exemplary setups of touch slider sensors with respect to the speed profiles (scrolling speed) are shown in FIG. 4. In FIG. 4a to FIG. 4d different possibilities are shown for a moving speed v of the cursor 5 in x- or y-direction depending on the position of the finger 7 on the surface of the sliding element 3.

Figure 4A:
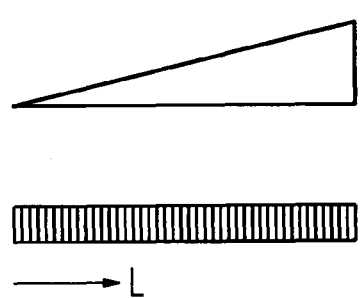

According to the example of FIG. 4a the moving speed of the cursor raises linear when the finger slides in longitudinal direction L. Thus, the geometrical position of the finger corresponds with the longitudinal direction L.

Figure 4B:
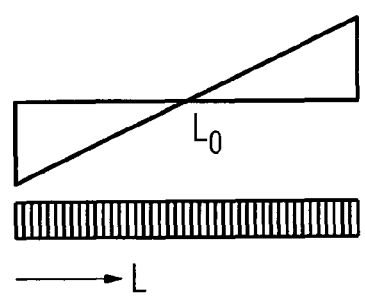

In FIG. 4b there is a zero speed at a location $L_0$ and thus the cursor moves forwards when the finger is above the position $L_0$ but moves backwards when the finger is below the position $L_0$.

Figure 4C:
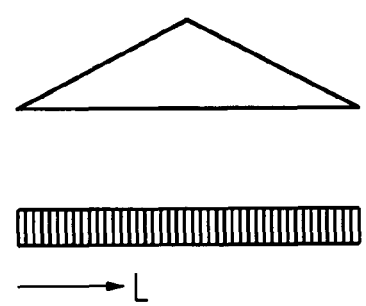
Figure 4D:
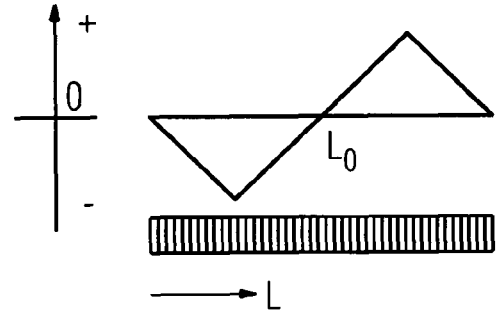

Analogue profiles are shown in FIG. 4c and FIG. 4d.

Thus, beneficial features of the proposed control panel can be summarized as follows:

An interface for controlling an oven is proposed with a sensor area with touch slider functionality, wherein at least one additional means of selecting between items of a multi-element list is employed, preferably a rotary bit decoder. The used display element is preferably a pixel controlled display.

The oven can be equipped with additional functions like microwave heating and steam cooking as well as pyrolytic cleaning.

The additional means of selecting between items of a multi-element list can be at least one additional sensor area with a touch slider functionality.

At least one of said touch slider sensors is arranged parallel to the edge of the display element.

Preferably, the movement of the finger of the user on the touch slider sensor allows the navigation through the main categories of the software of the control panel.

At least one of the touch slider sensors allows a one-directional or bi-directional move through different elements of a category at different speed.

The interface panel can be specially applied with an anti-stick coating in the area of the slider sensor to reduce negative visible impact by dirty fingers of the user.

At least one of the two geometrical end positions of at least one slider element can have an additional functionality. When the end region is directly touched a function can be triggered (e. g. input of "+" or "−" values, "Up" or "Down" function or "return" function). Only by initially touching the slider element in the area between said ends, the sliding function is active. Preferably, during sliding action, the whole geometrical slider area can be used without triggering said additional functionality in the end positions.

REFERENCE NUMERALS

1 User interface
2 Display element
3 Selecting means (sliding element)
4 Selecting means
5 Cursor
6 Surface
7 Finger
8 Edge side
9 Edge side
10 Rotary encoder
11 Selection button
11' Selection button
11" Selection button
12 End region
13 End region
14 On-/Off-Switch
D Data
Z Location
x First axial position
y Second axial position
L Longitudinal direction
v Speed

The invention claimed is:

1. An oven having a user interface, the user interface comprising:
   a display screen displaying a virtual keyboard having an array of characters; and
   a touch-sensitive non-virtual first slider element and a touch-sensitive non-virtual second slider element located outside the surface of the display screen, with the first slider element next to a first edge of the display screen and the second slider element next to a second edge of the display screen, wherein the characters are distributed as a two-dimensional array having a first dimension and a second dimension perpendicular to the first dimension,
   wherein the first slider element moves a cursor along the first dimension and the second slider element moves the cursor along the second dimension,
   wherein a position of the cursor on the array depends on a contact point of a user's finger on the first and the second slider elements, and
   wherein characters highlighted by the cursor can be inputted into a control panel of the oven by touching an end segment of the first slider element.

2. The oven according to claim 1, characterized in that the two slider elements each has an anti-stick coating and in that the at least one display screen is a pixel controlled display.

3. A control panel, said control panel comprising a user interface according to claim 1.

4. A method for selecting and inputting information into a control panel of an oven by using a user interface, wherein the user interface comprises:
   a display screen displaying a virtual keyboard having an array of characters, wherein the characters are distributed as a two-dimensional array having a first dimension and a second dimension perpendicular to the first dimension;
   a touch-sensitive non-virtual first slider element that can move a cursor along the first dimension; and
   a selecting means that can move the cursor along the second dimension, wherein the method comprises steps of:
a) moving a user's finger along a surface of the first slider element, until the cursor reached a desired location on the array of characters along the first dimension;
b) positioning the cursor via the selecting means along the second dimension under the cursor reaches a final desired location on the array of characters; and
c) inputting information displayed at the final desired location into the control panel by touching an end segment of the slider element.

5. The method according to claim 4, characterized in that the position of the cursor along the first dimension depends on the contact point of the user's finger with the first slider element.

6. The method according claim 4, characterized in that the moving speed of the cursor along the first dimension depends on the contact point of the user's finger with the first slider element, wherein the speed increases continuously along the first slider element.

7. The method according claim 4, characterized in that the moving speed of the cursor along the first dimension depends on the contact point of the user's finger with the first slider element, wherein the speed is zero at a longitudinal position between the ends of the first slider element.

8. The oven according to claim 1, wherein the first slider element is arranged parallel to the first edge of the display screen and the second slider element is arranged parallel to the second edge of the display screen.

9. The oven according to claim 1, wherein the cursor cannot be moved along the first dimension and the second dimension simultaneously.

10. An oven having a user interface, the user interface comprising:
a display screen displaying a virtual keyboard having an array of characters; and
a touch-sensitive non-virtual first slider element and a knob located outside the surface of the display screen, with the slider element next to an edge of the display screen,
wherein the characters are distributed as a two-dimensional array having a first dimension and a second dimension perpendicular to the first dimension,
wherein the slider element moves a cursor along the first dimension and the knob moves the cursor along the second dimension,
wherein a position of the cursor on the array along the first dimension depends on a contact point of a user's finger on the slider element, and
wherein characters highlighted by the cursor can be inputted into a control panel of the oven by touching an end segment of the slider element.

11. An oven having a user interface, the user interface comprising:
a display screen displaying a virtual keyboard having an array of characters; and
a touch-sensitive non-virtual first slider element and at least one selection button located outside the surface of the display screen, with the slider element next to an edge of the display screen,
wherein the characters are distributed as a two-dimensional array having a first dimension and a second dimension perpendicular to the first dimension,
wherein the slider element moves a cursor along the first dimension and the at least one selection button moves the cursor along the second dimension, and
wherein a position of the cursor on the array along the first dimension depends on a contact point of a user's finger on the slider element, and
wherein characters highlighted by the cursor can be inputted into a control panel of the oven by touching an end segment of the slider element.

12. The oven of claim 10, wherein characters highlighted by the cursor can be inputted into a control panel of the oven by touching an end segment of the first slider element.

13. The oven of claim 10, wherein the moving speed of the cursor along the first dimension depends on the contact point of the user's finger with the first slider element, wherein the speed increases continuously along the first slider element.

14. The oven of claim 10, wherein the moving speed of the cursor along the first dimension depends on the contact point of the user's finger with the first slider element, wherein the speed is zero at a longitudinal position between the ends of the first slider element.

15. The oven of claim 11, wherein characters highlighted by the cursor can be inputted into a control panel of the oven by touching an end segment of the first slider element.

16. The oven of claim 11, wherein the moving speed of the cursor along the first dimension depends on the contact point of the user's finger with the first slider element, wherein the speed increases continuously along the first slider element.

17. The oven of claim 11, wherein the moving speed of the cursor along the first dimension depends on the contact point of the user's finger with the first slider element, wherein the speed is zero at a longitudinal position between the ends of the first slider element.

18. The oven of claim 1, wherein the array of characters include letters, numbers, and symbols.

19. The oven of claim 1, wherein a text box is displayed above the array of characters in the display screen, and characters already inputted are displayed in the text box.

* * * * *